United States Patent
Thomas

(10) Patent No.: US 8,336,666 B2
(45) Date of Patent: Dec. 25, 2012

(54) HOOD HINGE

(75) Inventor: Dylan Neil Thomas, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 12/257,492

(22) Filed: Oct. 24, 2008

(65) Prior Publication Data

US 2010/0101048 A1   Apr. 29, 2010

(51) Int. Cl.
*B62D 25/10* (2006.01)
(52) U.S. Cl. .............. 180/274; 180/69.21; 296/193.11
(58) Field of Classification Search .............. 180/274, 180/69.2, 69.21; 16/221, 222, 361; 296/193.11
See application file for complete search history.

(56) References Cited

U.S. PATENT DOCUMENTS

| | | | | |
|---|---|---|---|---|
| 3,643,755 A * | 2/1972 | Gionet et al. | | 180/69.21 |
| 3,893,207 A * | 7/1975 | Rudaitis et al. | | 180/69.21 |
| 4,012,807 A * | 3/1977 | Kern | | 16/288 |
| 4,097,958 A * | 7/1978 | Van Dell | | 16/225 |
| 4,366,598 A | 1/1983 | Harasaki et al. | | |
| 4,727,621 A * | 3/1988 | Emery et al. | | 16/239 |
| 4,839,941 A | 6/1989 | Orlando | | |
| 5,842,735 A * | 12/1998 | Makino et al. | | 296/187.12 |
| 6,439,330 B1 * | 8/2002 | Paye | | 180/69.21 |
| 6,543,086 B2 | 4/2003 | Bjureblad et al. | | |
| 6,817,435 B2 * | 11/2004 | Takeuchi | | 180/274 |
| 6,834,735 B2 * | 12/2004 | Kim | | 180/69.21 |
| 6,934,999 B2 | 8/2005 | Kreth et al. | | |
| 7,207,406 B1 | 4/2007 | Polz et al. | | |
| 7,231,995 B1 | 6/2007 | Polz et al. | | |
| 7,296,325 B1 | 11/2007 | Putumbaka et al. | | |
| 7,637,344 B2 * | 12/2009 | Park | | 180/274 |
| 7,690,465 B2 * | 4/2010 | Hirata | | 180/69.21 |
| 2002/0014367 A1 * | 2/2002 | Sasaki et al. | | 180/274 |
| 2002/0170759 A1 | 11/2002 | Son | | |
| 2004/0232729 A1 * | 11/2004 | Kreth et al. | | 296/193.11 |
| 2007/0074919 A1 * | 4/2007 | Hirata | | 180/69.2 |
| 2007/0187993 A1 * | 8/2007 | Kalargeros | | 296/193.11 |

FOREIGN PATENT DOCUMENTS

| | | | |
|---|---|---|---|
| DE | 10 2004 011 334 A1 * | 11/2005 | |
| JP | 2007-55504 | * 3/2007 | |
| JP | 2007-290498 | 11/2007 | |

* cited by examiner

*Primary Examiner* — Joseph Rocca
*Assistant Examiner* — George Spisich
(74) *Attorney, Agent, or Firm* — Plumsea Law Group, LLC

(57) ABSTRACT

A hinge for a hood of a motor vehicle is disclosed. The hinge is configured to bend towards a frame of the motor vehicle during a collision. The hinge includes upwards turned flanges to help prevent upwards buckling.

15 Claims, 9 Drawing Sheets

HOOD HINGE

BACKGROUND OF THE INVENTION

1. Field of the Invention

The present invention relates to motor vehicles and in particular to a hinge for a hood.

2. Description of Related Art

Motor vehicles include hinges that attach a hood to a motor vehicle. In a collision with a pedestrian, a hood may impact a pedestrian. In previous designs, hood hinges have been configured to reduce the force of an impact between a hood and a pedestrian during a collision. Some hood hinges have been configured to raise a hood during a collision and then lower the hood to reduce the impact of the hood on a pedestrian. Some hinges have been configured with stopping members to limit the rotation of a hood after an impact. This lowers the hood and helps to absorb the energy of the collision.

During a front impact collision, a hood may also impact a windshield. The related art lacks provisions for preventing damage to a windshield during a front impact collision, while also reducing the force of an impact applied by a hood during a pedestrian collision. There is a need in the art for a design that addresses these problems.

SUMMARY OF THE INVENTION

A hinge for a motor vehicle hood is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, including: a hinge including a first portion and a second portion, the hinge being configured to attach a hood to the motor vehicle; the first portion including a base portion; the first portion further including a first flange portion and a second flange portion; the first flange portion extending at an angle from the base portion and the second flange portion extending at an angle from the base portion; and where the first flange portion and the second flange portion extend towards the hood.

In another aspect, the invention provides a motor vehicle, including: a hinge including a first portion and a second portion; the first portion including a first end portion that is attached to a hood of the motor vehicle; the first portion including a second end portion that is attached to the second portion; the first portion including an intermediate portion that is disposed between the first end portion and the second end portion; and where the intermediate portion is configured to bend in a manner that controls the motion of a rear portion of the hood away from a windshield of the motor vehicle during a collision.

In another aspect, the invention provides a motor vehicle, including: a hinge including a first portion that is attached to a hood of the motor vehicle and the hinge including a second portion that is attached to a frame of the motor vehicle; the first portion including a base portion and a flange portion; the hood including a sidewall portion; and where the flange portion extends at an angle to the base portion and wherein the flange portion is disposed adjacent to the sidewall portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
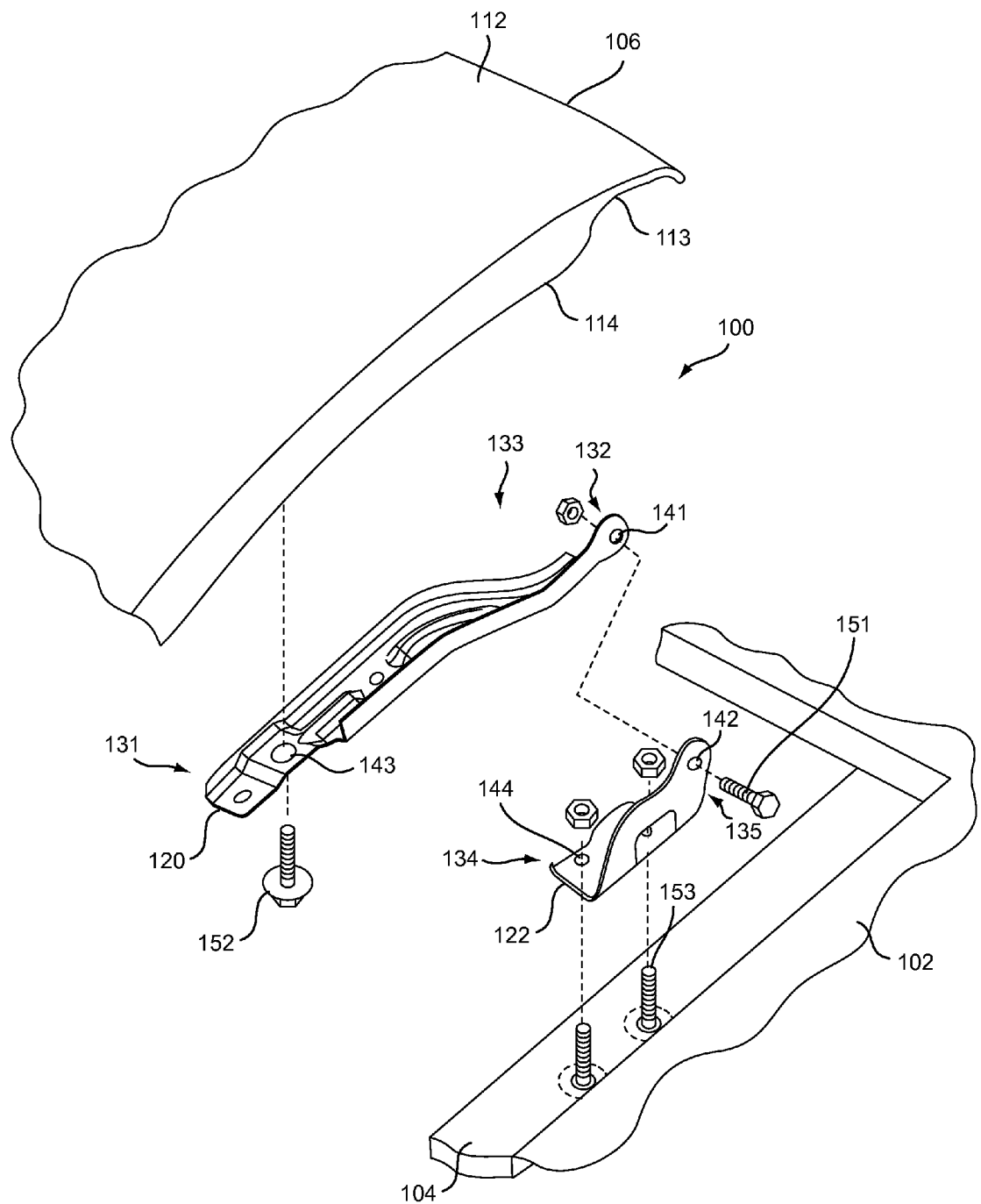
FIG. 1 is an exploded isometric view of an exemplary embodiment of a hinge for a hood.
Figure 2:
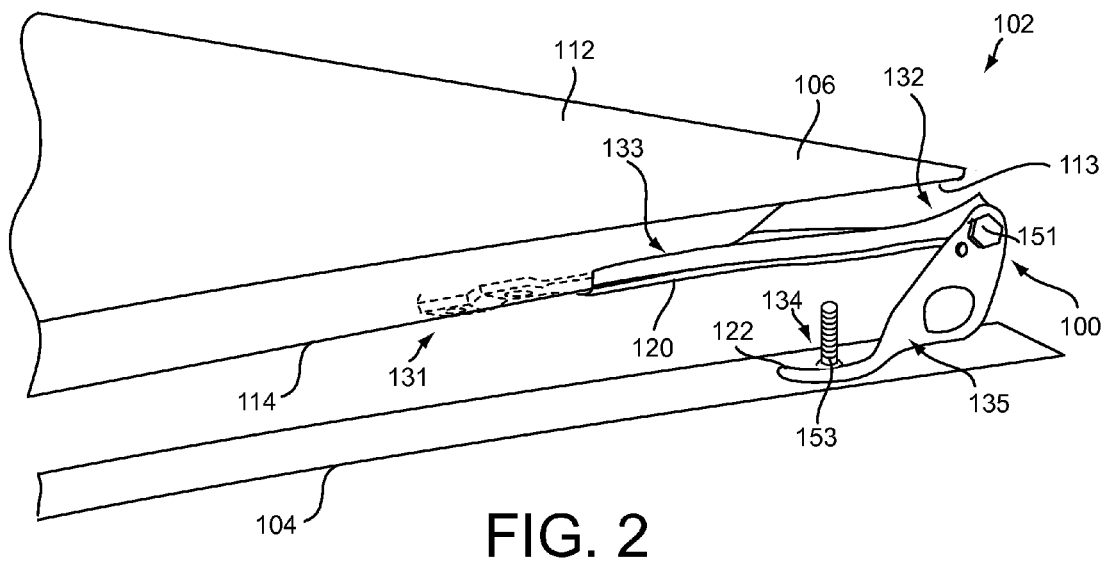
FIG. 2 is an assembled isometric view of an exemplary embodiment of a hinge for a hood.

FIG. 1 is an exploded isometric view of an exemplary embodiment of a hinge configured to be used with a hood of a motor vehicle. FIG. 2 is an assembled isometric view of an exemplary embodiment of a hinge configured to be used with a hood of a motor vehicle. Referring to FIGS. 1 and 2, hinge 100 may be configured to connect hood 106 to motor vehicle 102. In particular, hinge 100 may be configured to connect hood 106 with frame portion 104 of motor vehicle 102. In an exemplary embodiment, hood 106 may be raised and lowered with respect to frame portion 104 using hinge 100 to provide access to an engine bay disposed below hood 106.

Frame portion 104 may be any portion of a frame or body of a motor vehicle that is disposed adjacent to a hood. For example, in some cases, frame portion 104 could be a portion of a motor vehicle body disposed adjacent to an engine bay of motor vehicle 102. In an exemplary embodiment, frame portion 104 may be disposed proximate to a windshield of motor vehicle 102.

Hood 106 may comprise hood skin 112 and hood frame 113. Hood skin 112 may provide a smooth continuous surface visible on the exterior of motor vehicle 102. Also, hood frame 113 may be associated with the underside of hood 106. For purposes of clarity, only a portion of hood 106 is shown in the current embodiments.

In some embodiments, hood frame 113 may be further associated with sidewall portion 114. In some cases, sidewall portion 114 may be angled with respect to hood skin 112. In an exemplary embodiment, sidewall portion 114 may extend in a generally perpendicular direction with respect to hood skin 112.

In some embodiments, hinge 100 may comprise first portion 120 and second portion 122, which are configured to attach to hood 106 and frame portion 104, respectively. First portion 120 may further comprise first end portion 131 and second end portion 132. First portion 120 may also comprise intermediate portion 133 that is disposed between first end portion 131 and second end portion 132. Likewise, second portion 122 may comprise flat portion 134 and angled portion 135. Angled portion 135 is angled with respect to flat portion 134.

For purposes of description, first portion 120 can be associated with multiple directions. In particular, first portion 120 can be associated with a longitudinal direction, a lateral direction and a vertical direction. The term "longitudinal direction" as used throughout this detailed description and in the claims refers to a direction that is disposed along a length of first portion 120. In other words, the longitudinal direction runs between first end portion 131 and second end portion 132. Likewise, the term "lateral direction" as used throughout this detailed description and in the claims refers to a direction that is disposed along a width of first portion 120. The lateral direction is perpendicular to the longitudinal direction. Furthermore, the term "vertical direction" as used throughout this detailed description and in the claims refers to a direction perpendicular to both the longitudinal direction and the lateral direction.

In different embodiments, the shape of first portion 120 can vary. In some cases, first end portion 131 and second end portion 132 can be offset from one another in a lateral direction. In other cases, first end portion 131 and second end portion 132 can be offset from one another in a vertical direction. In one exemplary embodiment, first end portion 131 is offset from second end portion 132 in a vertical direction. In particular, intermediate portion 133 can be curved. With this arrangement, first end portion 131 may be disposed further from hood 106 of motor vehicle 102 than second end portion 132.

First portion 120 and second portion 122 may include provisions for fastening to one another. In some cases, first portion 120 and second portion 122 may include one or more fastening holes. In other cases, first portion 120 and second portion 122 may include other provisions for fastening to one another. In this exemplary embodiment, first portion 120 and second portion 122 include fastening holes that are configured to receive a fastener of some kind.

Referring to FIG. 1, first portion 120 may include first fastening hole 141 disposed within second end portion 132. Also, second portion 122 may include second fastening hole 142 disposed within angled portion 135. First fastening hole 141 and second fastening hole 142 may be configured to receive first fastener 151. With this arrangement, second end portion 132 may be fastened to angled portion 135, as illustrated in FIG. 2.

Generally, any type of fastener may be used to fasten first portion 120 and second portion 122 together. In some cases, the fastener can be a nut and bolt type fastener. In other cases, the fastener can be any type of mechanical fastener including, but not limited to, screws, rivets, pins, clips, as well as other types of fasteners. A fastener can be chosen that provides for a pivoting movement between first portion 120 and second portion 122. In this exemplary embodiment, first fastener 151 may be a rivet. With this arrangement, first portion 120 may be configured to pivot with respect to second portion 122 about first fastener 151.

First portion 120 can include provisions to attach to hood frame 113. In some embodiments, first end portion 131 can include one or more fastening holes disposed within first end portion 131. In some cases, first end portion 131 can include a single fastening hole. In other cases, first end portion 131 can include two or more fastening holes. In an exemplary embodiment, first end portion 131 may include a single fastening hole. In particular, in this embodiment, first end portion 131 includes third fastening hole 143.

Hood frame 113 can also be provided with one or more fastening holes. In particular, hood frame 113 can be provided with a set of fastening holes that correspond with the fastening holes provided on first end portion 131. In this embodiment, hood frame 113 may include a single fastening hole that corresponds with third fastening hole 143. For purposes of illustration, this fastening hole in hood frame 113 is not shown.

Hood frame 113 and first portion 120 may be attached using second fastener 152. In particular, third fastening hole 143 and a corresponding fastening hole in hood frame 113 may be configured to receive second fastener 152. In this embodiment, second fastener 152 may be a bolt or screw. In other embodiments, however, second fastener 152 can be another type of fastener. Furthermore, in still other embodiments, first end portion 131 of first portion 120 can be attached to hood frame 113 using any method known in the art. For example, in another embodiment, first end portion 131 may be welded or otherwise fused to hood frame 113. Using this arrangement, first portion 120 may be fixedly attached to hood frame 113 of hood 106, as illustrated in FIG. 2.

Second portion 122 can include provisions to attach to frame portion 104 of motor vehicle 102. In this embodiment, second portion 122 may include fastening hole set 144 disposed within flat portion 134 of second portion 122. Generally, fastening hole set 144 can include any number of fastening holes. In an exemplary embodiment, fastening hole set 144 includes two fastening holes. Fastening hole set 144 is configured to receive fastener set 153 that is disposed through frame portion 104. In this exemplary embodiment, fastener set 153 includes two fasteners. However, it should be understood that in other embodiments, fastener set 153 can include a number of fasteners that corresponds to the number of fastener holes provided on flat portion 134 of second portion 122. With this arrangement, second portion 122 may be fixedly attached to frame portion 104, as illustrated in FIG. 2.

A hinge may be configured to bend in different directions. The term "downward bending" as used throughout this detailed description and in the claims refers to bending towards a frame of a motor vehicle. In other words, downward bending is bending away from a hood of the motor vehicle. Likewise, the term "upwards bending" is used in the detailed description and in the claims to refer to bending towards a hood of the motor vehicle. In other words, upwards bending refers to bending away from the frame of the motor vehicle. Furthermore, upwards buckling and downwards buckling refer to buckling of the hinge towards a hood and away from a hood, respectively.

In embodiments where there is potential for a hood to impact a windshield during a collision, a first portion of a hinge can include provisions for controlling the internal bending moment of the hinge. In particular, the first portion can be configured to bend in a manner that controls the motion of a rear portion of the hood away from a windshield. For example, in some cases, the attachment point between the first portion and the hood can be lowered to facilitate downward bending of the first portion. Additionally, the first portion can be provided with a geometric structure that resists upward buckling. With this arrangement, the first portion can be configured to bend downward during a front collision, which can help prevent the rearward end of the hood from striking the windshield.

Figure 3:
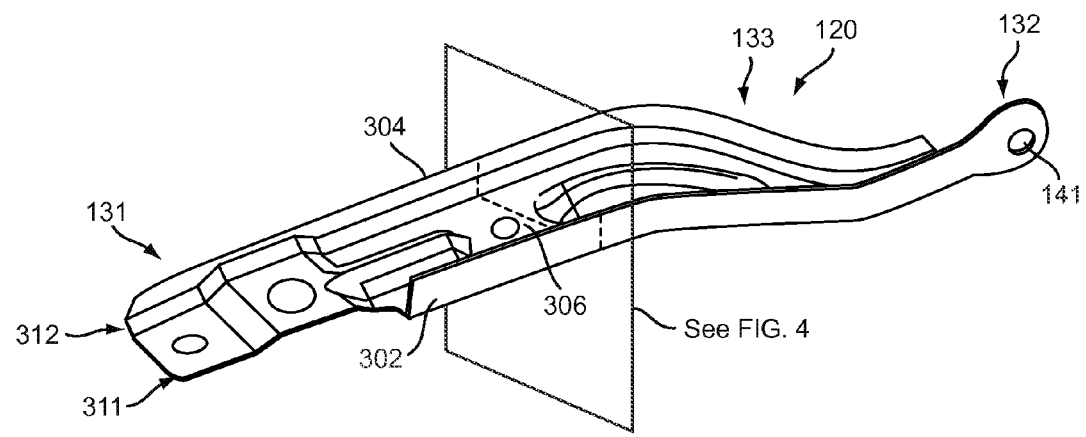
FIG. 3 is an isometric view of an exemplary embodiment of a first portion of a hinge.
Figure 4:
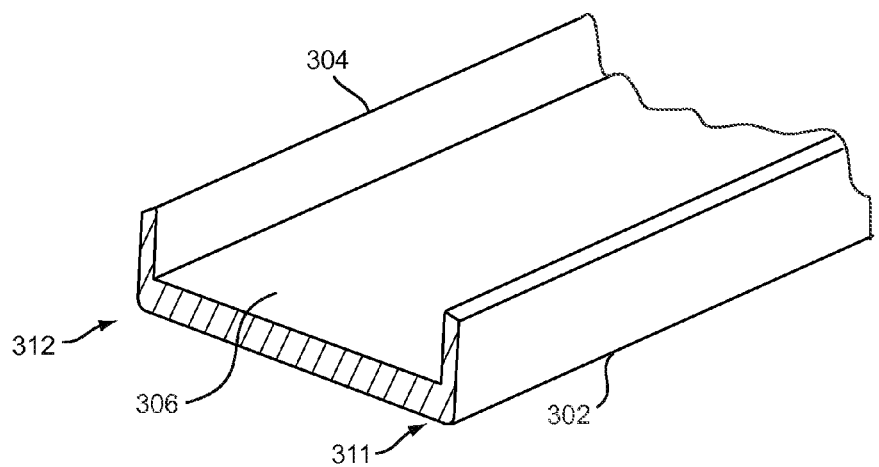
FIG. 4 is an isometric cross sectional view of an exemplary embodiment of a first portion of a hinge.

Referring to FIGS. 3 and 4, first portion 120 can include provisions to resist upwards buckling. In some embodiments, first portion 120 can include one or more flange portions. In this exemplary embodiment, first portion 120 may include first flange portion 302 and second flange portion 304. First flange portion 302 may be disposed on first lateral edge 311 of first portion 120. Generally, first flange portion 302 may extend along any portion of the length of first portion 120. In some cases, first flange portion 302 may only extend over a portion of the length of first portion 120. In an exemplary embodiment, first flange portion 302 may extend from second end portion 132 to intermediate portion 133 of first portion 120. With this arrangement, first flange portion 302 may provide additional cross sectional strength to first portion 120.

Likewise, second flange portion 304 may be disposed on second lateral edge 312 of first portion 120. Generally, second flange portion 304 may extend along any portion of the length of first portion 120. In some cases, second flange portion 304 may only extend over a portion of the length of first portion 120. In an exemplary embodiment, second flange portion 304 may extend along the entire length of first portion 120. With this arrangement, second flange portion 304 may provide additional cross sectional strength to first portion 120.

In some embodiments, first fastening hole 141 can be disposed on a flange portion. In this embodiment, first fastening hole 141 may be disposed on first flange portion 302. In other embodiments, however, first fastening hole 141 could be disposed on second flange portion 304. With this arrangement, first flange portion 302 can be configured to contact second portion 122 of hinge 100 directly, as seen in FIG. 2.

Generally, first flange portion 302 and second flange portion 304 may be disposed at an angle with respect to base portion 306 of first portion 120. Base portion 306 may be a substantially flat portion of first portion 120. In other exemplary embodiments, base portion 306 may be curved. In some cases, first flange portion 302 and second flange portion 304 could be turned upwards, towards a hood of a motor vehicle. In still other embodiments, first flange portion 302 and second flange portion 304 could be disposed in another direction with respect to base portion 306. In an exemplary embodiment, first flange portion 302 and second flange portion 304 may be upward turned flanges. In particular, first flange portion 302 and second flange portion 304 may extend upwards from base portion 306 at approximately right angles. First flange portion 302 and second flange portion 304 may extend toward the hood. Furthermore, first flange portion 302 and second flange portion 304 may be approximately parallel with one another. With this arrangement, first flange portion 302 and second flange portion 304 may be used to control the cross sectional inertial properties of first portion 120 in order to help resist upward buckling.

Although the current embodiment includes two flange portions, in other embodiments, first portion 120 of a hinge could include a single flange portion. In some cases, the single flange portion could be disposed on first lateral edge 311. In other cases, the single flange portion could be disposed on second lateral edge 312. In still other embodiments, first portion 120 could include more than two flange portions. For example, in an alternative embodiment, first portion 120 could include a third flange disposed in base portion 306. By modifying the number of flanges in different embodiments, the cross sectional inertial properties of first portion 120 can be fine tuned to help control buckling.

Figure 5:
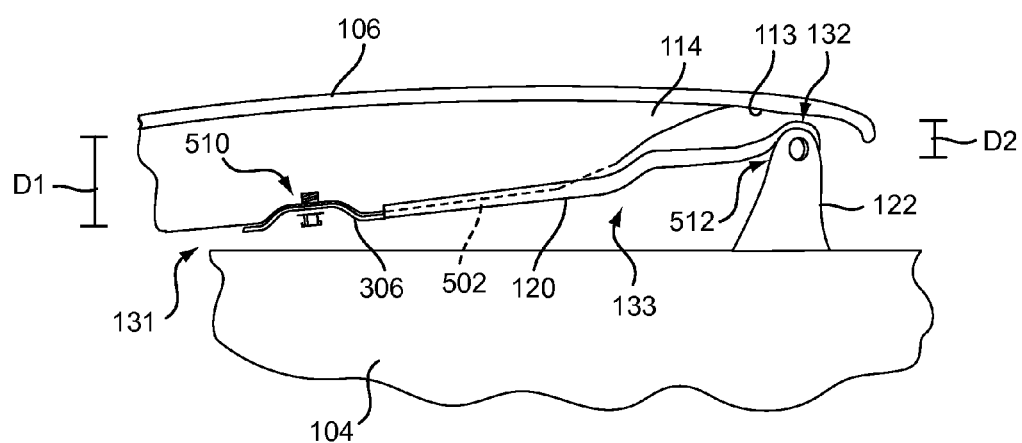
FIG. 5 is a side view of an exemplary embodiment of a hinge.

FIG. 5 illustrates a side view of an exemplary embodiment of hood 106 in a closed position. In this embodiment, hood frame 113 is attached directly to first portion 120, as previously discussed. First portion 120 is shaped to conform to the shape of hood frame 113. In particular, first flange portion 302 may be disposed adjacent to sidewall portion 114 of hood frame 113. This arrangement may allow lower portion 502 of hood frame 113 to be disposed against base portion 306 of first portion 120.

In this embodiment, lower portion 502 of hood frame 113 may be attached to first end portion 131 of first portion 120 at attachment region 510. Likewise, second end portion 132 of first portion 120 may be attached to second portion 122 at pivot region 512. This arrangement of first portion 120 provides a bending moment along intermediate portion 133 during a collision, since first end portion 131 and second end portion 132 are fixed in place when hood 106 is closed.

A first portion of a hinge can include provisions to facilitate downward bending, or bending towards a frame of the motor vehicle, during a collision. In some cases, changing the location of the attachment between a hood and a first portion can change the bending moment of the first portion. For example, by lowering the attachment of the first portion to the hood below the pivot of the hinge, this can facilitate downward bending during a front collision.

In some embodiments, the attachment region between first portion 120 and hood 106 can be lowered in order to promote downward bending during a collision. In some cases, this lowered configuration for attachment region 510 can be achieved by providing first portion 120 with a tilted orientation when hood 106 is closed. In other cases, this lowered configuration for attachment region 510 can be achieved by using a geometry for first portion 120 that raises second end portion 132 with respect to first end portion 131. In an exemplary embodiment, first portion 120 may be shaped so that first attachment region 510 is lowered with respect to pivot region 512. In particular, intermediate portion 133 can have a curved shape in the vertical direction. This arrangement disposes second end portion 132 below first end portion 131.

In this embodiment, attachment region 510 may be disposed a distance D1 from hood 106. Also, second end portion 132, which is connected to second portion 122 at pivot region 512, is disposed a distance D2 from hood 106. Generally, the values of distance D1 and distance D2 may vary. In some cases, distance D1 may be larger than distance D2. In other cases, distance D1 may be less than distance D2. In still other cases, distance D1 and distance D2 could be substantially similar. In one exemplary embodiment, distance D1 is greater than distance D2. In other words, attachment region 510 is disposed further from hood 106 than pivot region 512. With this arrangement, first portion 120 may be configured with a bending moment that promotes downward bending during a front collision.

Generally, this lowered configuration for attachment region 510 can be achieved in any manner. In some embodiments, first portion 120 may be shaped so that first end portion 131 is disposed below second end portion 132 in a generally vertical direction. In other embodiments, first portion 120 can be rotated downwards from a generally horizontal position when hinge 100 is in a closed position. Sidewall portion 114 of hood 106 extends downwards to attach to base portion 306 of first portion 120. With this arrangement, attachment region 510 can be lowered with respect to pivot region 512 to promote downward bending.

Figure 6:
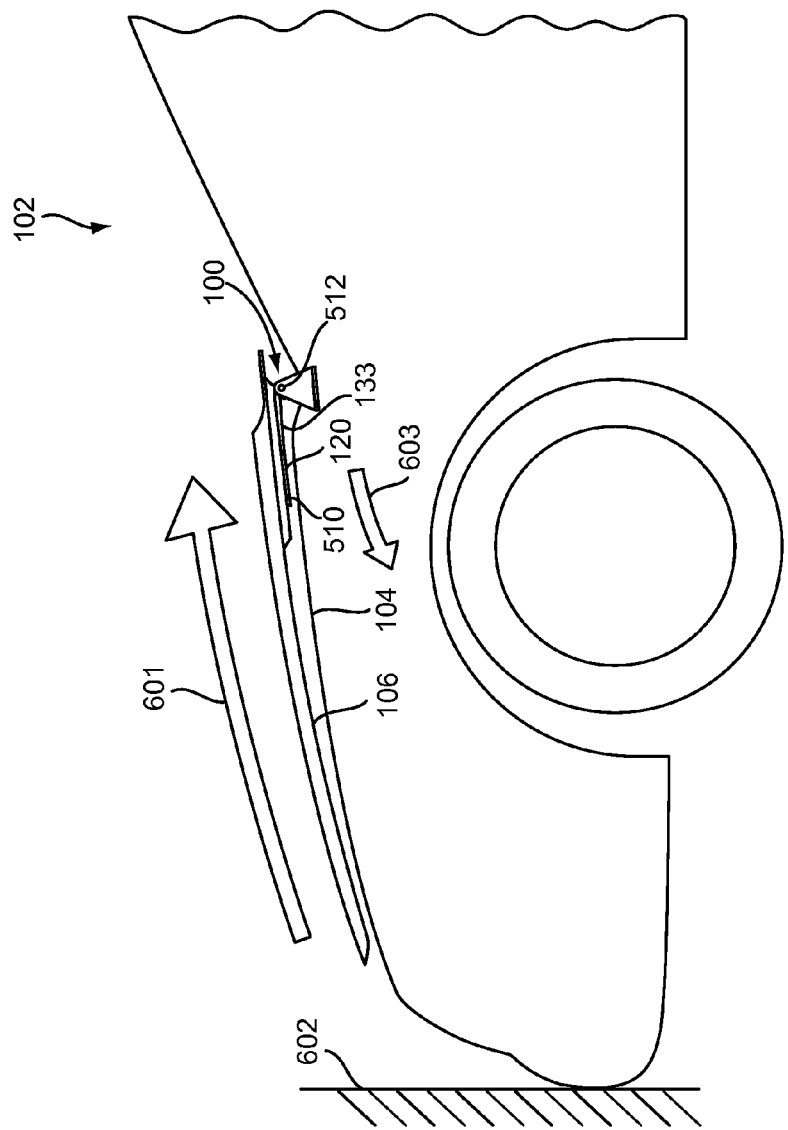
FIG. 6 is a schematic view of an exemplary embodiment of a motor vehicle impacting a barrier.
Figure 7:
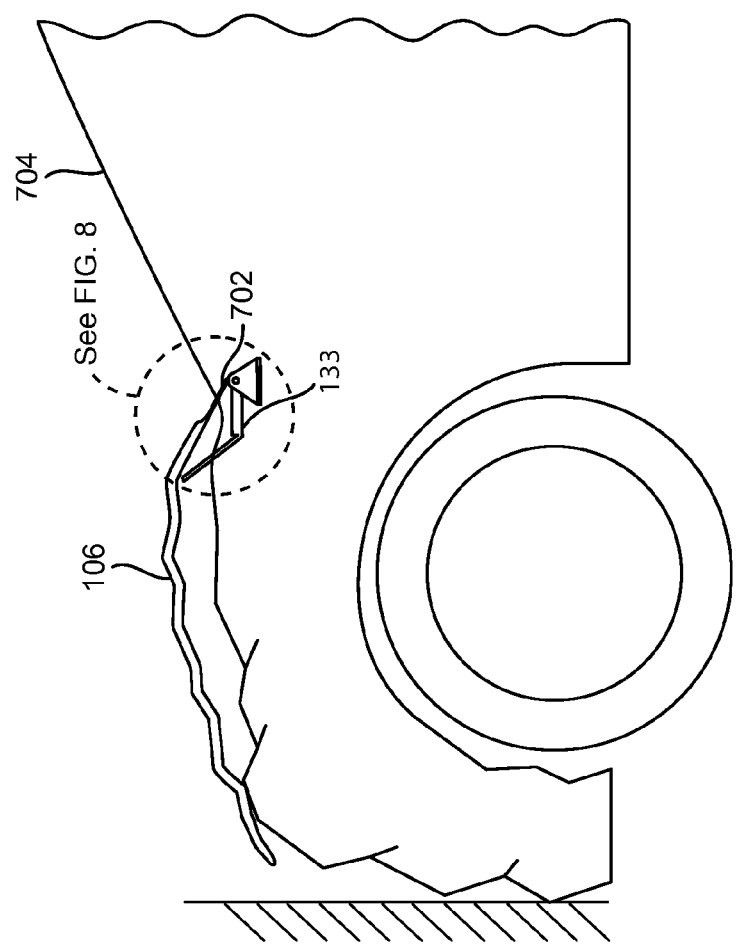
FIG. 7 is a schematic view of an exemplary embodiment of a motor vehicle following an impact with a barrier.
Figure 8:
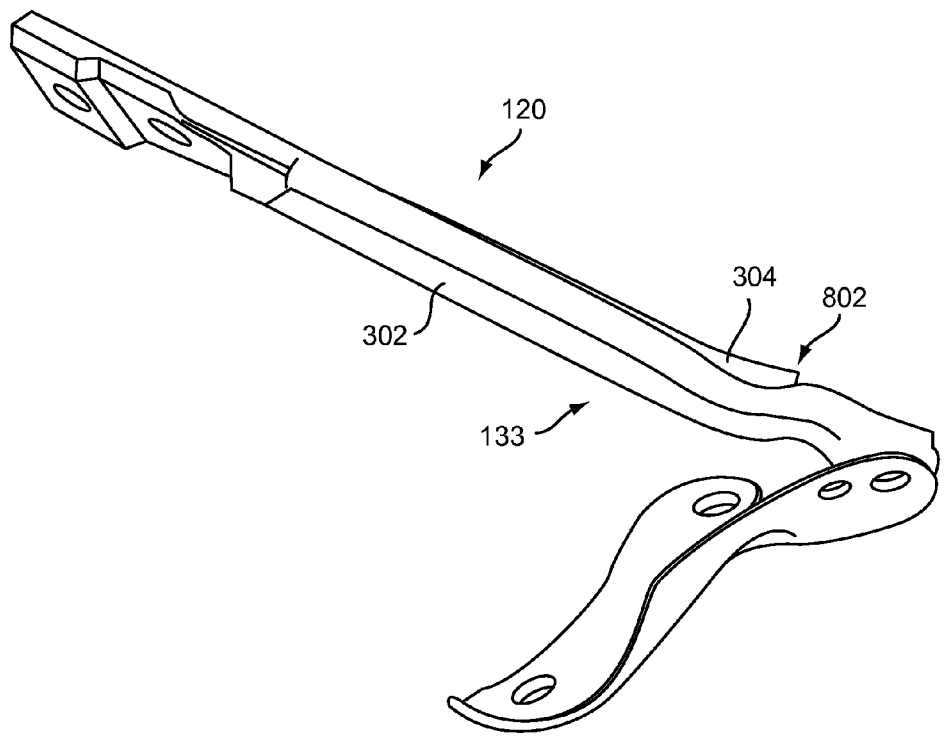
FIG. 8 is an isometric view of an exemplary embodiment of a first portion of a hinge that has undergone bending.

FIGS. 6-8 are schematic views intended to illustrate the deformation of an exemplary embodiment of a hinge upper during a front collision. FIG. 6 illustrates an exemplary embodiment of motor vehicle 102 during an initial moment of impact with barrier 602. Referring to FIG. 6, barrier 602 may apply contact force 601 to hood 106. This may result in reactive force 603 applied by hinge 100 in the opposite direction. Since the reactive force of hinge 100 is directed slightly downwards due to the lowered position of attachment region 510 with respect to pivot region 512, the application of contact force 601 and reactive force 603 create a bending moment in first portion 120 that causes intermediate portion 133 to bend downwards during the collision. In particular, intermediate portion 133 may bend towards frame portion 104.

Referring to FIG. 7, as intermediate portion 133 bends downwards, rearward portion 702 of hood 106 also bends downwards. Furthermore, as rearward portion 702 bends downwards, rearward portion 702 may be prevented from striking windshield 704 of motor vehicle 102. This arrangement may help prevent injury to any front seat occupants of motor vehicle 102.

FIG. 8 illustrates an exemplary embodiment of first portion 120 following a collision with a motor vehicle. For purposes of clarity, first portion 120 is shown in isolation. Referring to FIG. 8, intermediate portion 133 has undergone deformation at bending region 802. In particular, intermediate portion 133 has undergone downward bending towards a frame of the motor vehicle. Furthermore, first flange portion 302 and second flange portion 304 have buckled downwards at bending region 802, which helps prevent upwards bending.

Figure 9:
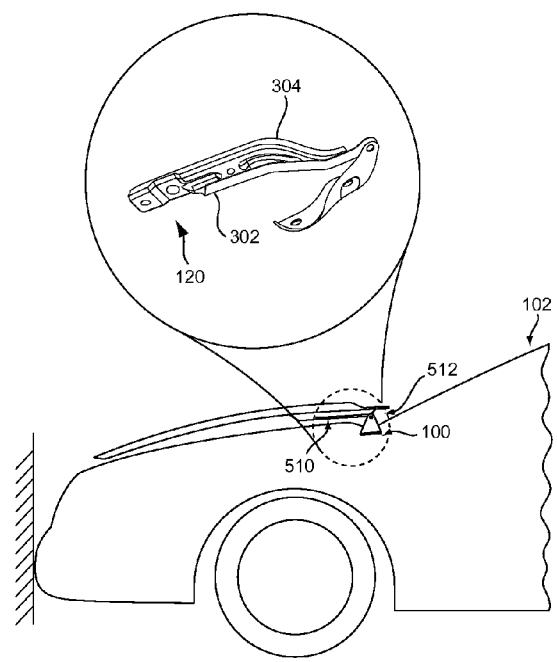
FIG. 9 is a schematic view of an exemplary embodiment of a motor vehicle prior to a collision.
Figure 10:
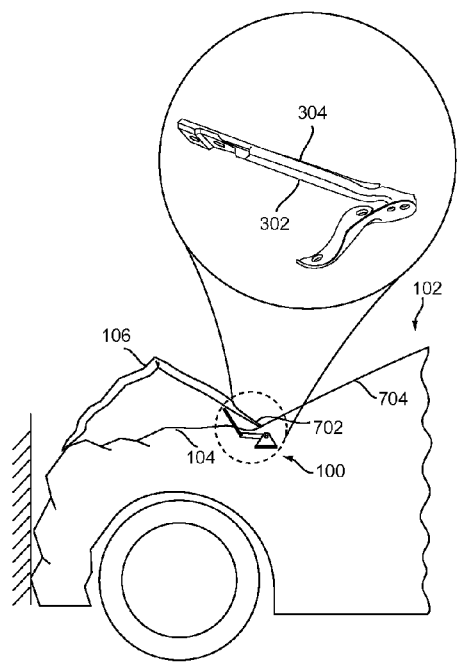
FIG. 10 is a schematic view of an exemplary embodiment of a motor vehicle following a collision.

FIGS. 9 and 10 illustrate a schematic view of a motor vehicle. In FIGS. 9 and 10, motor vehicle 102 is configured with hinge 100 of the previous embodiments. In particular, first portion 120 of hinge 100 has a bending moment that is configured for downwards bending. In particular, attachment region 510 is disposed below pivot region 512. Also, first portion 120 includes first flange portion 302 and second flange portion 304 that are upward turned flanges configured to resist upward buckling. As previously discussed, during a front collision, first portion 120 bends downwards, towards frame portion 104. This helps prevent rearward portion 702 of hood 106 from contacting windshield 704.

Figure 11:
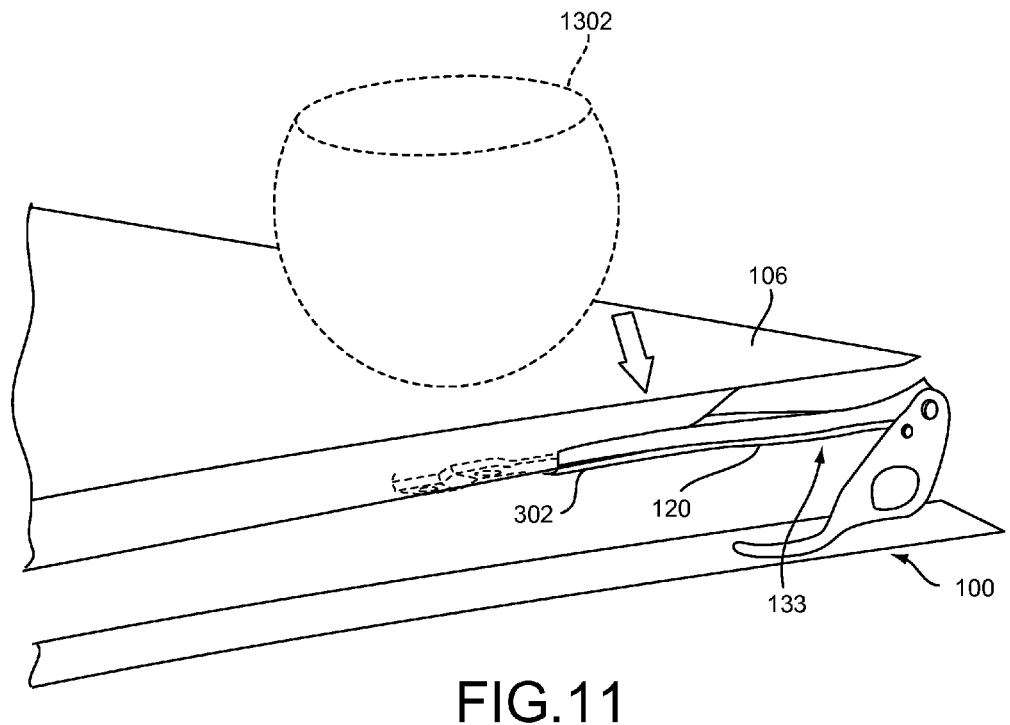
FIG. 11 is an isometric view of an exemplary embodiment of a portion of a hood during a pedestrian collision.
Figure 12:
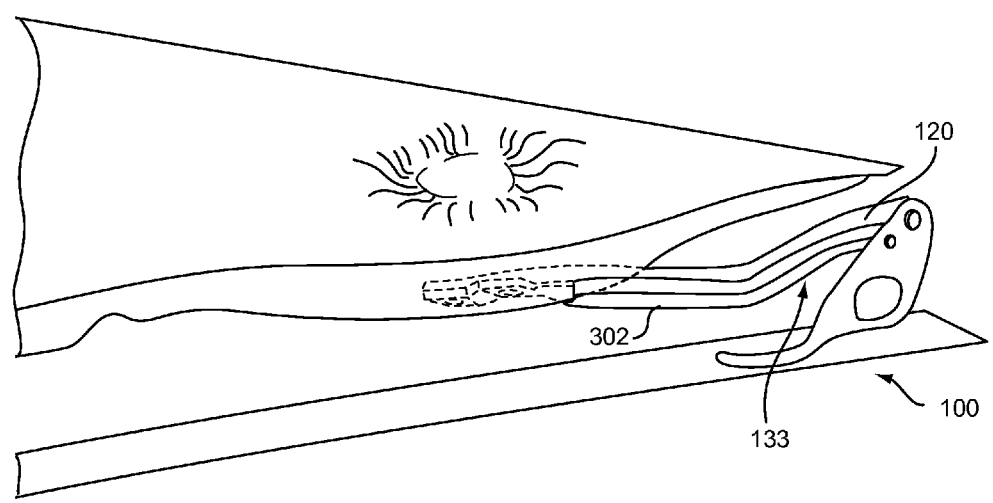
FIG. 12 is an isometric view of an exemplary embodiment of a hood following a pedestrian collision.

In embodiments where a hinge includes provisions for downwards bending, the hinge may more easily collapse downwards during a pedestrian collision. Referring to FIGS. 11 and 12, as a portion of pedestrian 1302 strikes hood 106, a downward force is applied to hood 106. First portion 120 is configured to facilitate downward bending. Therefore, as the force is applied downwards on first portion 120, intermediate portion 133 may be configured to bend downwards, as seen in FIG. 12. Furthermore, first flange portion 302 is turned upwards, to decrease resistance to downwards buckling. Second flange portion 304 (not shown) is also turned upwards in order to decrease resistance to downwards buckling. With this arrangement, hinge 100 can be configured to easily give in during a pedestrian collision, rather than presenting a stiff hinge that could increase the likelihood of injury to the pedestrian.

While various embodiments of the invention have been described, the description is intended to be exemplary, rather than limiting and it will be apparent to those of ordinary skill in the art that many more embodiments and implementations are possible that are within the scope of the invention. Accordingly, the exemplary embodiments are not to be restricted except in light of the attached claims and their equivalents. Also, various modifications and changes may be made within the scope of the attached claims.

What is claimed is:

1. A motor vehicle, comprising:
   a hinge including a first portion that moves with a hood of the motor vehicle and a second portion, the hinge being configured to attach the hood to the frame of the motor vehicle;
   the first portion including a base portion, a first end portion configured to attach to the hood, a second end portion configured to attach to the second portion of the hinge, and an intermediate portion disposed between the first end portion and the second end portion, the intermediate portion being curved in a vertical direction;
   the first portion further including a first flange portion and a second flange portion, wherein the first flange portion has a shorter length than the second flange portion;
   wherein the first flange portion and the second flange portion extend at a right angle from the base portion;
   wherein the first flange portion and the second flange portion extend upwards from the base portion towards the hood at the intermediate portion;
   wherein the first flange portion is configured to attach to the second portion of the hinge;
   wherein the second flange portion extends from the first end portion to the second end portion;
   wherein the first portion is attached to the second portion by a fastener such that the first portion is configured to pivot with respect to the second portion at the fastener;
   wherein the second portion rigidly connects the frame of the motor vehicle to the fastener;
   wherein an impact to the hood deflects the first portion downward more than the second portion; and
   wherein the intermediate portion is configured to bend towards the frame of the motor vehicle.

2. The motor vehicle according to claim 1, wherein the first end portion is disposed further from a top surface portion of the hood of the motor vehicle than the second end portion.

3. The motor vehicle according to claim 1, wherein the first flange portion and the second flange portion are configured to resist upward buckling.

4. The motor vehicle according to claim 1, wherein the first flange portion and the second flange portion are approximately parallel with each other.

5. The motor vehicle according to claim 1, wherein a cross-section of the first flange portion, the second flange portion and the base portion form a u-shape at the intermediate portion.

6. The motor vehicle according to claim 1 wherein the fastener is immovably fixed to the first portion and the second portion.

7. The motor vehicle according to claim 1, wherein the first end portion is attached to a sidewall portion of the hood.

8. A motor vehicle, comprising:

a hinge comprising a first portion and a second portion;

the first portion including a first end portion that is attached to a hood of the motor vehicle;

the first portion including a second end portion that is attached to the second portion by a fastener such that the first portion pivots with respect to the second portion at the fastener, and wherein the fastener is immovably fixed to the first portion and the second portion;

the first portion including an intermediate portion that is disposed between the first end portion and the second end portion;

wherein the first end portion is attached to a sidewall portion of the hood and is disposed further from a top surface portion of the hood of the motor vehicle than the second end portion;

wherein a cross-section of the intermediate portion forms a u-shape;

wherein the intermediate portion is configured to bend in a manner that controls the motion of a rear portion of the hood away from a windshield of the motor vehicle during a collision;

wherein the second portion rigidly connects the frame of the motor vehicle to the fastener; and wherein an impact to the hood deflects the first portion downward more than the second portion.

9. The motor vehicle according to claim 8, wherein the intermediate portion is configured to bend away from the hood.

10. The motor vehicle according to claim 8, wherein the intermediate portion is configured to bend towards a frame portion of the motor vehicle.

11. The motor vehicle according to claim 8, wherein the intermediate portion is configured to buckle downwards during an impact.

12. The motor vehicle according to claim 8, wherein the first portion includes a flange portion and wherein the first portion is attached to the second portion at the flange portion.

13. The motor vehicle according to claim 12, wherein the flange portion is disposed adjacent to the sidewall portion of the hood.

14. The motor vehicle according to claim 8, wherein the first end portion is disposed lower than the second end portion in a generally vertical direction, the vertical direction being a direction running between the hood and a frame of the motor vehicle.

15. The motor vehicle according to claim 14, wherein the intermediate portion is curved in the generally vertical direction.

* * * * *